(12) United States Patent
Miura

(10) Patent No.: US 6,405,489 B1
(45) Date of Patent: Jun. 18, 2002

(54) STRUCTURE FOR MOUNTING DOOR WEATHER STRIP

(75) Inventor: Yoshihiro Miura, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/686,790

(22) Filed: Oct. 12, 2000

(30) Foreign Application Priority Data

Oct. 13, 1999 (JP) .............................................. 11-291170

(51) Int. Cl.[7] .................................................. E06B 7/16
(52) U.S. Cl. ...................... 49/479.1; 49/498.1; 49/475.1
(58) Field of Search .............................. 49/498.1, 475.1, 49/493.1, 479.1

(56) References Cited

U.S. PATENT DOCUMENTS

| | | | | |
|---|---|---|---|---|
| 5,127,193 A | * | 7/1992 | Okada et al. ............... | 49/495.1 |
| 5,244,704 A | * | 9/1993 | Arima ......................... | 428/369 |
| 5,269,101 A | * | 12/1993 | Nozaki et al. .............. | 49/479.1 |
| 5,389,409 A | | 2/1995 | Iwasa et al. | |
| 5,449,544 A | | 9/1995 | Ogawa et al. | |
| 5,655,333 A | * | 8/1997 | Yamashita ................... | 49/441 |
| 5,693,419 A | * | 12/1997 | Nozaki ........................ | 428/354 |
| 5,715,632 A | | 2/1998 | Nozaki | |
| 5,918,421 A | | 7/1999 | Nozaki | |
| 6,012,760 A | | 1/2000 | Nozaki | |
| 6,115,969 A | * | 9/2000 | Nozaki ........................ | 49/479.1 |

FOREIGN PATENT DOCUMENTS

JP 2-38218 3/1990

* cited by examiner

*Primary Examiner*—Gregory J. Strimbu
(74) *Attorney, Agent, or Firm*—Pillsbury Winthrop LLP

(57) ABSTRACT

In the mounting base section of a door weather strip, first and second mounting faces extend in the longitudinal direction while making a right angle with respect to each other. Between these mounting faces, there is provided a twisted face which continues from the first mounting face to the second mounting face. One piece of double-sided adhesive tape is continuously attached to the door weather strip from the first mounting face to the second mounting face via the twisted face, and these mounting faces and the twisted face are bonded to the door by the double-sided adhesive tape.

7 Claims, 7 Drawing Sheets

STRUCTURE FOR MOUNTING DOOR WEATHER STRIP

BACKGROUND OF THE INVENTION

1. Field of the Invention

The present invention relates to a structure for mounting a door weather strip in the periphery of a door of an automobile.

The present application is based on Japanese Patent Application No. Hei. 11-291170, which is incorporated herein by reference.

2. Description of the Related Art

Conventionally, in the periphery of a door of an automobile, there is provided a door weather strip to seal a clearance between the door and a door opening formed in the automobile body. For example, as shown in FIGS. 6 and 7, this door weather strip 41 includes: a mounting base section 42; and a hollow seal section 43, wherein the door weather strip 41 is made of elastic material such as rubber, thermoplastic elastomer, foamed these materials, the cross-section of which is formed into the substantially same shape with respect to the entire periphery of the door.

Concerning the structure for mounting this door weather strip 41 on the door 44, the following structure (the first conventional structure) is well known. On the mounting face 42a at the bottom of the mounting base section 42, there are provided a plurality of clips 45 at predetermined intervals, and the mounting face 42a of the mounting base section 42 is mounted on an outer peripheral surface of the door 44 by these clips 45. Also, the following structure (the second conventional structure) is well known. There is provided a double-sided adhesive tape 46 such as pressure sensitive adhesive double coated tape on the mounting face 42a of the mounting base section 42 with respect to the entire length of the door weather strip, and the mounting face 42a is bonded to an outer peripheral surface of the door 44 by this double-sided adhesive tape 46.

However, the above first conventional structure is disadvantageous as follows. In each portion between the clips 45, the mounting face 42a can not come into close contact with the outer peripheral surface of the door 44. Therefore, there is a possibility that water leaks in the automobile cabin through this portion between the clips 45. Also, the above second conventional structure is disadvantageous as follows. Before the double-sided adhesive tape 46 is attached onto the mounting face 42a, the primer must have been coated on the mounting face 42a. Therefore, it takes time and labor for providing the double-sided adhesive tape 46 to the entire length of the door weather strip. Accordingly, the manufacturing cost is raised.

When the double-sided adhesive tape is applied to the entire length of the door weather strip, the manufacturing cost of the door weather strip is raised because the cost of the double-sided adhesive coated tape is relatively expensive.

Concerning the structure for mounting a door weather strip in which the double-sided coated tape is used, the following structure (the third conventional structure), which is disclosed in Unexamined Japanese Utility Model Publication 2-38218, is also known. The above third conventional structure is composed as follows. In the mounting base section of the door weather strip, there are provided two mounting faces which make a substantially right angle with each other. And the double-sided adhesive coated tape is attached to the mounting face on the side in which a load given to the mounting face in the case of opening and closing the door becomes a compressive load. Then, the mounting face is bonded to the periphery of the door panel by this double-sided adhesive tape.

That is, on the hinge side of the door, the double-sided adhesive tape is attached onto the first mounting face of the weather strip, so that the door weather strip is bonded to the outer peripheral surface of the door. At the bottom side of the door and the open side of the door opposite to the hinge side, another double-sided adhesive tape is attached onto the second mounting face of the door weather strip, so that the second mounting face is bonded to the extending surface which extends in a direction of substantially perpendicular to the outer peripheral surface of the door. At the corner section between the hinge side section and the bottom side section of the weather strip, the above two double-sided adhesive tapes are respectively extended to the first and second mounting faces and made to adhere onto both faces of the outer peripheral surface and the extending surface of the door.

However, in the above third conventional structure, the two adhesive tapes must be respectively made to adhere onto the first and second mounting faces. Therefore, it takes time and labor for this attaching work of the two adhesive tapes, which raises the manufacturing cost. Further, at the corner section of the door weather strip, it would be difficult to obtain the continuous sealing since the adhered positions of two ends of respective two adhesive tapes are located at different positions so that a gap occurs between the two ends. Accordingly, it is impossible to ensure a sufficiently high sealing property at the corner section.

In order to solve the above various problems, the following fourth conventional structure, which are shown in FIGS. 6A, 7A and 7B, is proposed. In this fourth conventional structure, the door weather strip 41 is composed in such a manner that the upper extrusion molding section 47A and the lower extrusion molding section 47B are connected with each other by two mold molding sections 48. The mounting faces 42a of the upper extrusion molding section 47A and both the mold molding section 48 are fixed to the door 44 by the clips 45 and the double-sided adhesive tape 46, and the mounting face 42a of the lower extrusion molding section 47B is fixed to the door 44 by the clips 45.

Further, the following mounting structure (the fifth structure), which is shown in FIGS. 6B and 7A to 7C, is proposed. In this door weather strip 41, the upper extrusion molding section 47A, lower extrusion molding section 47B and side extrusion molding section 47C are connected with each other by three mold molding sections 48. The mounting faces 42a of the upper extrusion molding section 47A, side extrusion molding section 47C and mold molding sections 48 are fixed to the door 44 by the clips 45 and the double-sided adhesive tape 46, and at the same time, the mounting face 42a of the lower extrusion molding section 47B is fixed to the door 44 by the clips 45. In this connection, the mold molding section 48 for connecting the upper extrusion molding section 47A with the lower extrusion molding section 47B, and the mold molding section 48 for connecting the side extrusion molding section 47C with the lower extrusion molding section 47B are respectively arranged at the belt line position of the door.

However, in the above fourth conventional structure, the following problems may be encountered. A portion in the periphery of the rear upper portion of the lower extrusion molding section 47B does not closely come into contact. Therefore, when rain water flows to the rear portion along the upper edge of the upper extrusion molding section 47A as shown by the arrow in FIG. 6A, it turns round the molding section 48 of the corner section and leaks in the automobile cabin through the end of the adhesive tape.

Further, in the above fifth conventional structure, the following problems may be encountered. The door weather strip 41 is composed of three extrusion molding sections 47A, 47B, 47C and three mold molding sections 48. Therefore, the number of parts is increased, and further the manufacturing work becomes complicated. Accordingly, the manufacturing cost is raised.

SUMMARY OF THE INVENTION

The present invention has been accomplished to solve the above problems of the background art. It is an object of the present invention to provide a structure for mounting a door weather strip characterized in that: the mounting work can be made easy and the manufacturing cost can be reduced; and no break of the sealing line is caused in the middle of the mounting face of the door weather strip, so that the door weather strip can be closely fixed to the door.

In order to accomplish the above object, the present invention according the first aspect provides a structure for mounting a door weather strip on a periphery of a door of an automobile, the weather strip having a mounting base section mountable on the periphery of the door and a hollow seal section formed on the mounting base section, the structure comprising: a first mounting face and a second mounting face each being formed on the mounting base section of the door weather strip, the first and second mounting faces being disposed to substantially make a right angle with each other and extending in a longitudinal direction of the door weather strip; a twisted face continuously formed on the mounting base section and between the first mounting face and the second mounting face; and a double-sided adhesive tape being continuously provided from the first mounting face to the second mounting face via the twisted face so that the first and second mounting faces and the twisted face are able to be tightly bonded to the door via the double-side adhesive tape with continuous sealing.

According to the invention, one piece of adhesive tape can be continuously attached to from one mounting face to the other mounting face via the twisted face. Therefore, the door weather strip can be easily attached to the door body, and at the same time, the manufacturing cost can be reduced. Since one piece of adhesive tape is continuously attached onto two mounting faces, no break of the sealing line is caused in the middle of the mounting face of the door weather strip. Accordingly, the door weather strip can be fixed being tightly contacted with the door. Therefore, water leaking can be prevented at the middle of the door weather strip.

In a structure for mounting a door weather strip according to the second aspect of the present invention, the twisted face is provided in a portion corresponding to a rear upper corner section of the door in the aforementioned structure.

In addition to the action provided by the invention above described, a rear upper corner section at the rear of the door weather strip can be more positively sealed, so that rain water flowing along the upper edge of the door weather strip can be prevented from getting into the automobile cabin through from the corner section.

In a structure for mounting a door weather strip according to the third aspect of the present invention, the door weather strip is composed of an upper extrusion molding section and a lower extrusion molding section which are connected with each other by a mold molding section, and the adhesive tape extends at least from the upper extrusion molding section to a rear upper portion of the lower extrusion molding section via the mold molding section of the corner section of the door weather strip.

The door weather strip can be composed of two extrusion molding sections and two mold molding sections, and the number of parts can be decreased so as to reduce the manufacturing cost. Further, the adhesive tape seals a portion adjacent to the rear upper portion of the lower extrusion molding section via the mold molding section of the corner section. Therefore, rain water flowing to the rear portion along the upper side edge of the door weather strip can be positively prevented from turning round the corner section and getting into the automobile cabin.

In a structure for mounting a door weather strip according to the fourth aspect of the present invention, the double-sided adhesive tape is provided in a substantially upper half peripheral section of the door weather strip to a portion close to the belt line of the door.

A portion of the door weather strip which is higher than the belt line of the door can be sufficiently sealed. Concerning a portion of the door weather strip which is lower than the belt line of the door, there is no possibility that water gets into the automobile cabin even if the portion is not sufficiently sealed. Therefore, the door weather strip can be easily attached to the door body by the conventional clips. Accordingly, the manufacturing cost can be reduced.

In a structure for mounting a door weather strip according to the fifth aspect of the present invention, the double-sided adhesive tape is provided on a mounting face on a side crossing the opening and closing direction of the door.

A load given to the door weather strip in the case of closing the door can be acted in a direction which crosses the adhesion face of the double-sided adhesive tape. Therefore, the life of adhesion of the door weather strip can be extended.

Further, according to the present invention, a door weather strip is provided, which comprises: an extrusion molding section comprising a mounting base section mountable on a periphery of a door and a hollow seal section formed on the mounting base section; a mold molding section comprising the mounting base section and the hollow seal section being continuously formed from the extrusion molding, wherein the extrusion molding section further comprises a first mounting face and a second mounting face each being formed on the mounting base section, the first and second mounting faces being disposed to substantially make a right angle with each other, and wherein the molding section further comprises: the first and second mounting faces being continuously formed from the extrusion molding; and a twisted face continuously formed on the mounting base section and between the first mounting face and the second mounting face; and a double-sided adhesive tape being continuously provided from the first mounting face to the second mounting face via the twisted.

It is preferable that the mold molding section is formed in a substantially L-shape so as to correspond to a corner of the door and be connected to a horizontal part and a vertical part of the extrusion molding section, and the double-sided adhesive tape is continuously provided from the first mounting face of the horizontal part of the extrusion molding section to the second mounting face of the vertical part of the extrusion molding section via the twisted face of the mold molding section.

Features and advantages of the invention will be evident from the following detailed description of the preferred embodiments described in conjunction with the attached drawings.

DETAILED DESCRIPTION OF THE PREFERRED EMBODIMENTS

Figure 1:
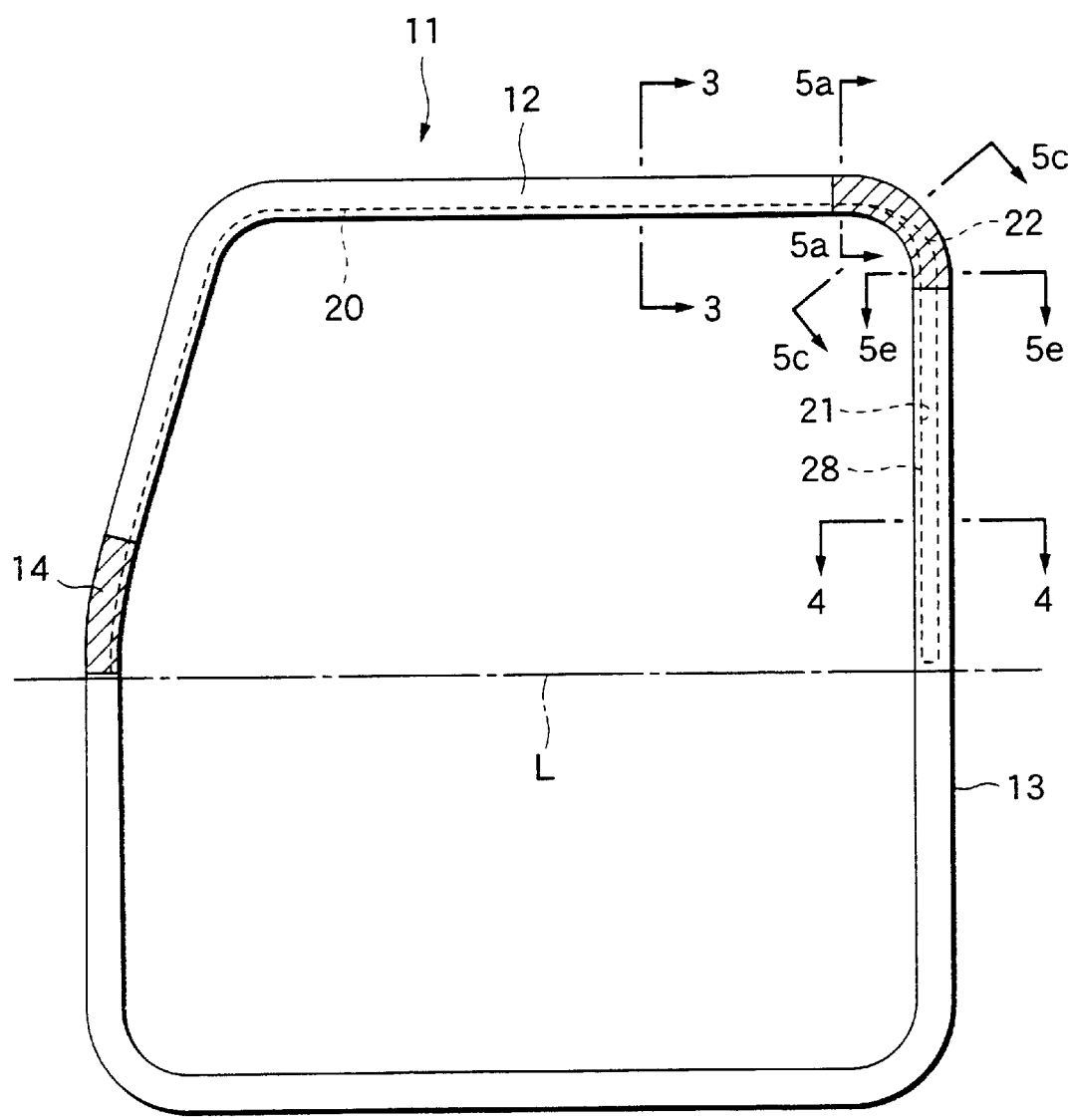
FIG. 1 shows a plan view of a right-side front door from inside the automobile cabin, to which a weather strip according to an embodiment of the present invention is attached.

Referring to FIGS. 1 to 5, an embodiment of the present invention will be explained below. In this connection, since the structure for mounting the front door weather strip for automobile use and the structure for mounting the rear door weather strip are substantially the same, the front door weather strip will be taken as an example and explained here.

As shown in FIGS. 1 to 4, the weather strip 11 of this embodiment includes: a substantially reverse L-shaped upper extrusion molding section 12 made of elastic material such as rubber; and a substantially U-shaped lower extrusion molding section 13, wherein the reverse L-shaped upper extrusion molding section 12 and the U-shaped lower extrusion molding section 13 are connected with each other by two mold molding sections 14, 15 and formed into a loop. The door weather strip 11 is provided with a mounting base section 16 and a hollow seal section 17 protruding from the mounting base section 16. The cross-section of the entire door weather strip 11 is formed substantially constant.

Figure 2:
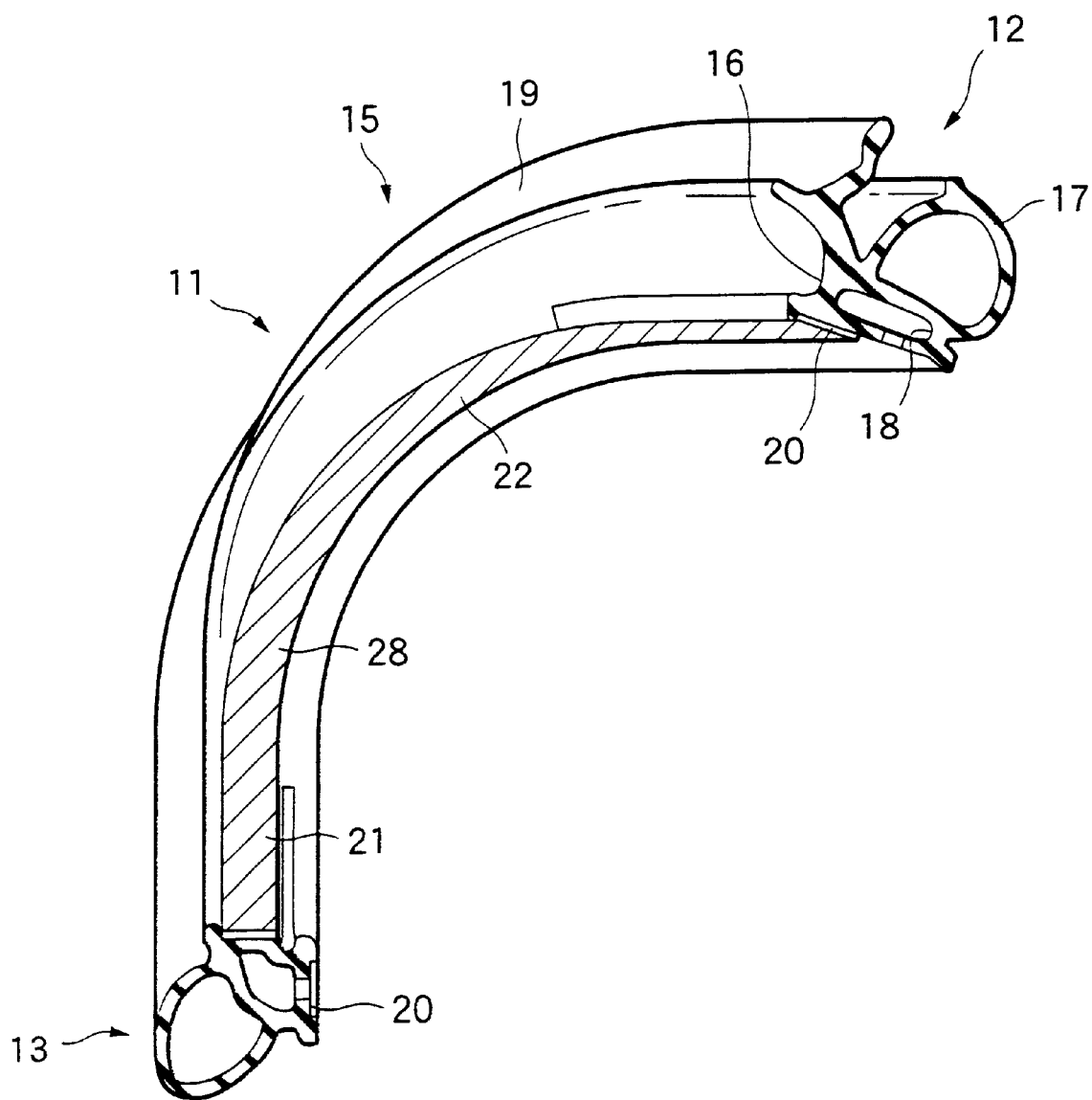
FIG. 2 shows a partial perspective view of the weather strip in FIG. 1, showing the oblique downward side from outside of the automobile.

Hereupon, FIG. 1 shows a plan view of a right-side front door from inside the automobile cabin. The weather strip 11 according to an embodiment of the present invention is attached on a back side of the door, so two mounting faces 20, 21 of the weather strip are shown by chain lines. In contrast, FIG. 2 shows a partial perspective view of the weather strip in FIG. 1. For the consideration of the attaching state of the weather strip 11 to the door, the perspective view shows the oblique downward side from outside of the automobile without a door.

In the upper extrusion molding section 12 and the lower extrusion molding section 13, the mounting base section 16 has a hollow section 18, and a head of the clip is arranged in the hollow section 18. From the upper extrusion molding section 12 to both the mold molding sections 14, 15, the mounting base section 16 has a lip section 19 which is protruding and used for sub-seal.

In the mounting base section 16 of each of the upper extrusion molding section 12, lower extrusion molding section 13 and front mold molding section 14 of the door weather strip 11, two mounting faces 20, 21 are formed which make a right angle with respect to each other and extend in the longitudinal direction. The first mounting face 20, which composes one of the mounting faces, is arranged on the bottom side of the mounting base section 16, and the second mounting face 21, which composes the other of the mounting faces, is arranged on the outside side face of the mounting base section 16.

As shown in FIGS. 2 and 5, there is provided a twisted face 22 in the mounting base section 16 of the rear mold molding section 15 composing the rear upper corner section of the door weather strip 11 corresponding to the rear upper corner of the front door. The first mounting face 20 on the upper extrusion molding section 12 continues to the second mounting face 21 on the lower extrusion molding section 13 via the twisted face 22 of the rear mold molding section 15.

Figure 3:
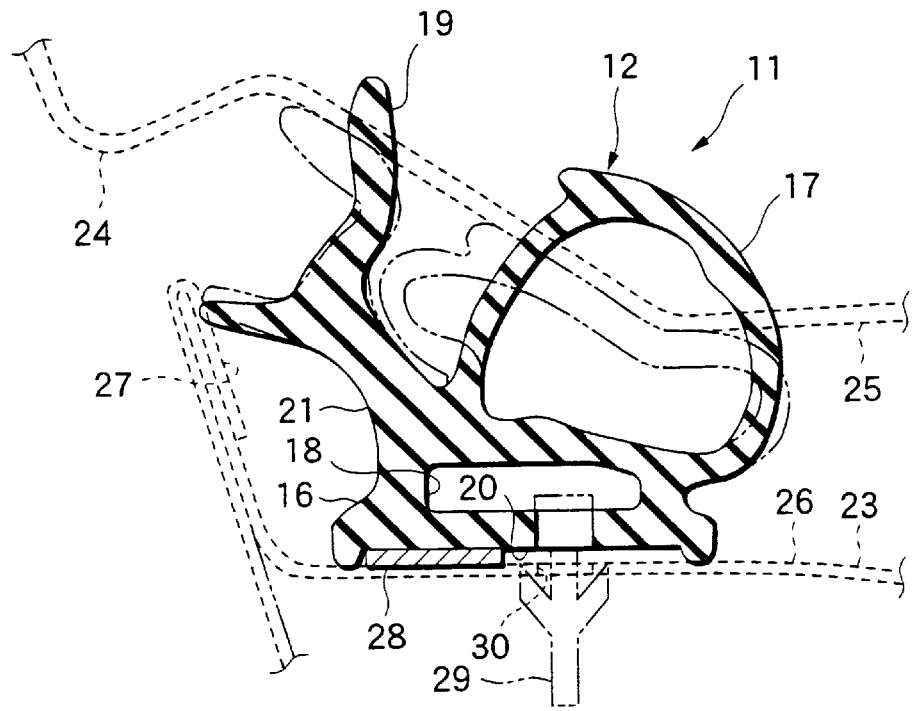
FIG. 3 shows an enlarged cross-sectional view taken on line 3—3 in FIG. 1.
Figure 4:
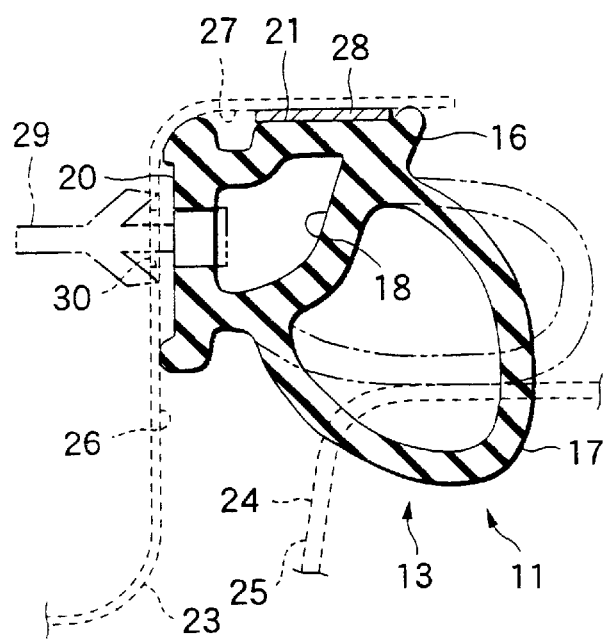
FIG. 4 shows an enlarged cross-sectional view taken on line 4—4 in FIG. 1.
Figure 5A:
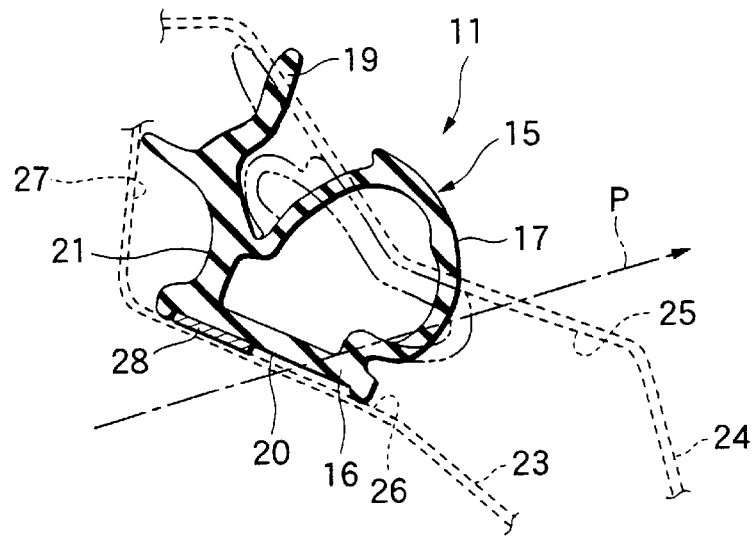
FIG. 5A shows an enlarged cross-sectional view taken on line 5a—5a in FIG. 1.
Figure 5B:
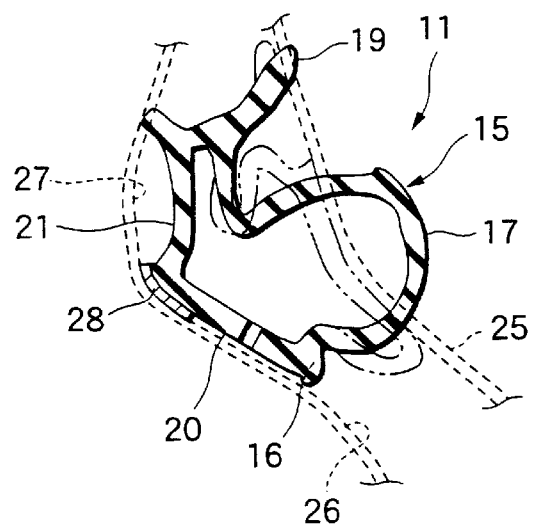
FIG. 5B shows an enlarged cross-sectional view at the intermediate position between line 5a—5a and line 5c—5c in FIG. 1.
Figure 5C:
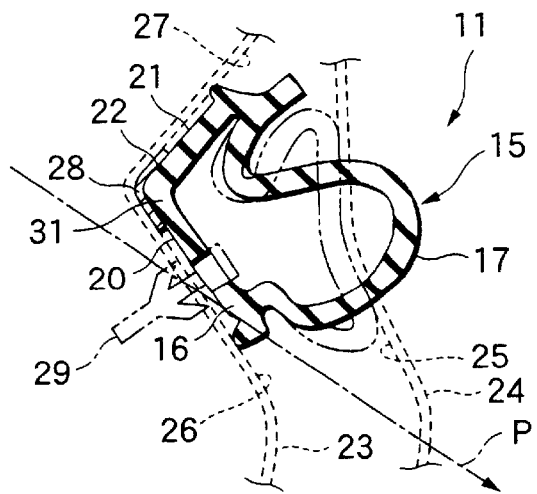
FIG. 5C shows an enlarged cross-sectional view taken on line 5c—5c in FIG. 1.
Figure 5D:
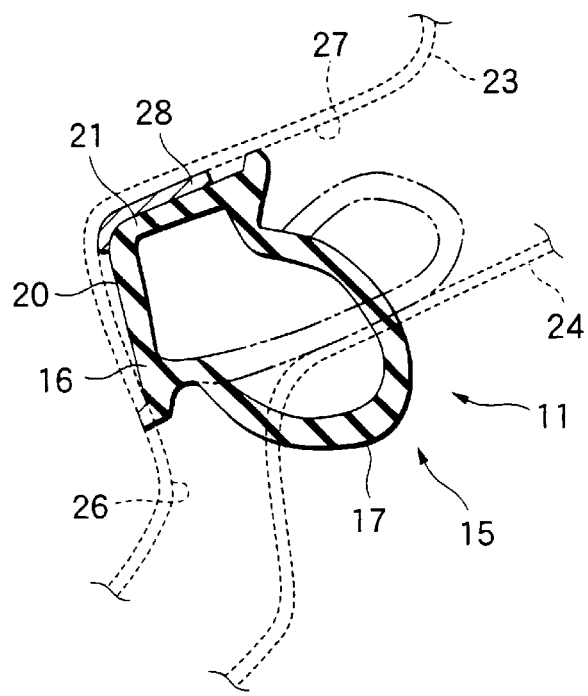
FIG. 5D shows an enlarged cross-sectional view at the intermediate position between line 5c—5c and line 5e—5e in FIG. 1.
Figure 5E:
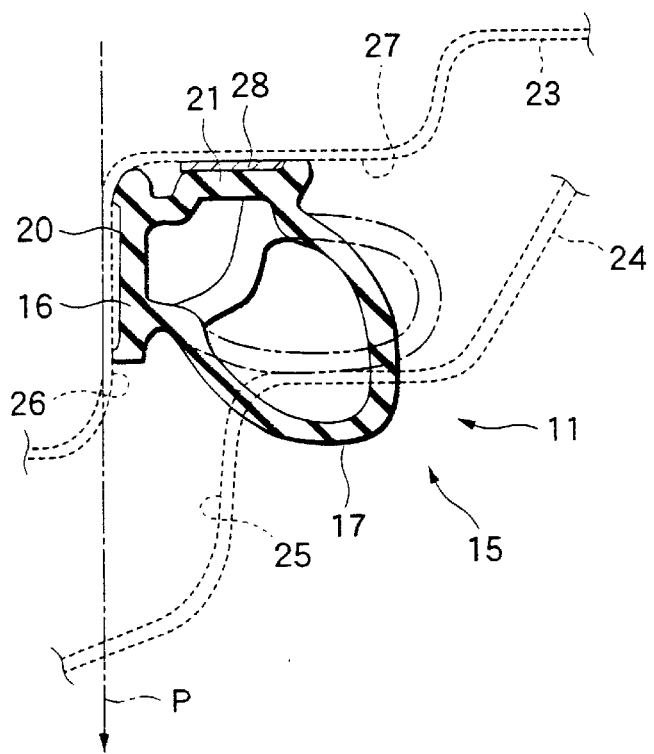
FIG. 5E shows an enlarged cross-sectional view taken on line 5e—5e in FIG. 1.
Figure 6A:
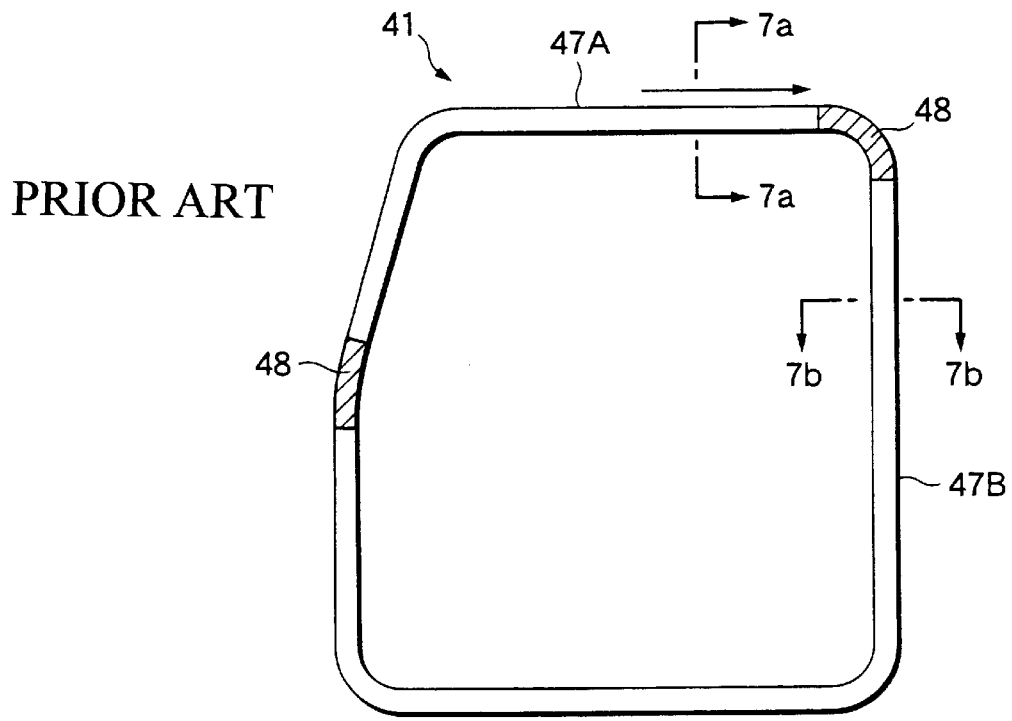
FIGS. 6A and 6B respectively show plan views of a conventional weather strip.
Figure 6B:
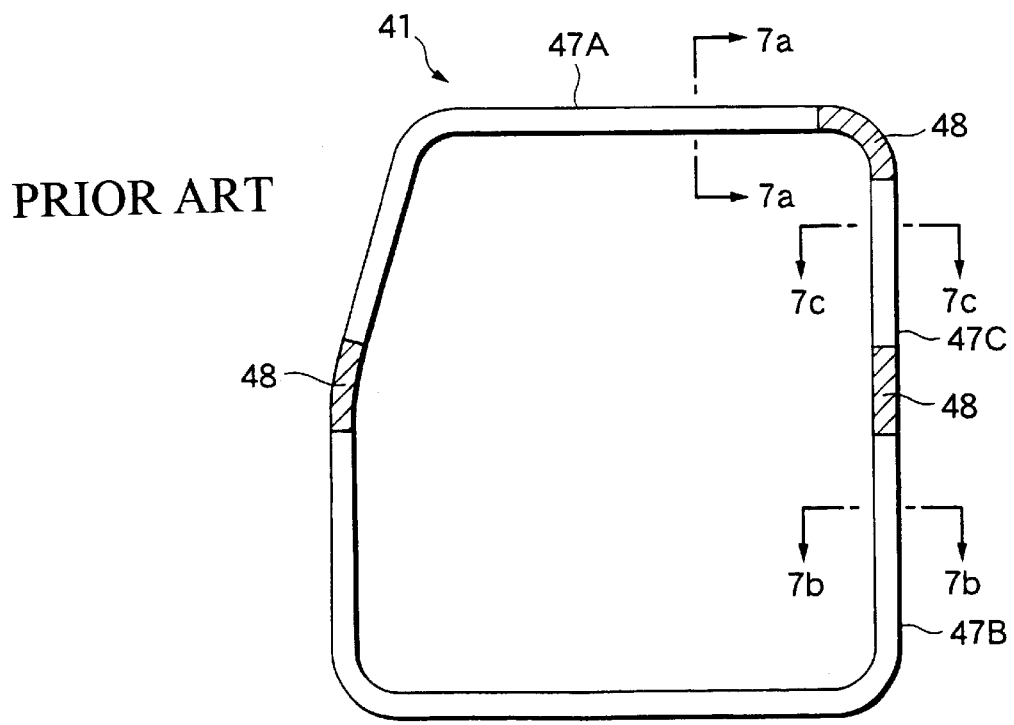
Figure 7A:
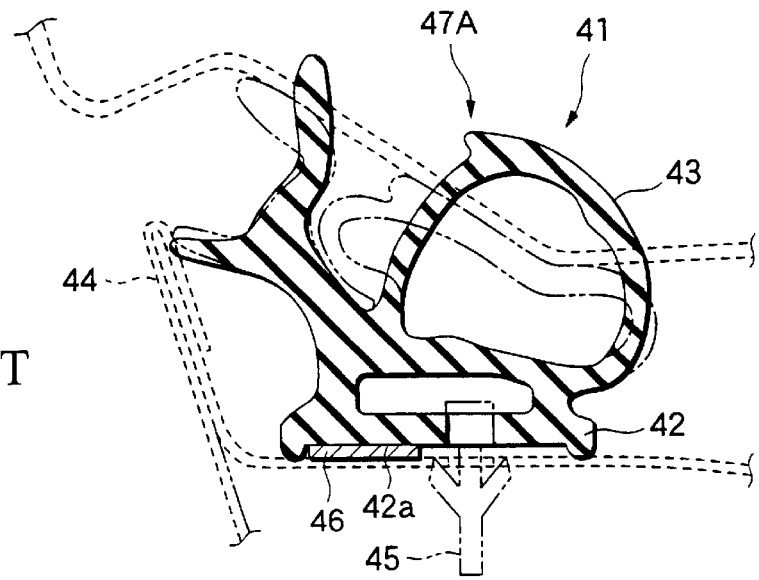
FIG. 7A shows an enlarged cross-sectional view taken on line 7a—7a in FIGS. 6A and 6B.
Figure 7B:
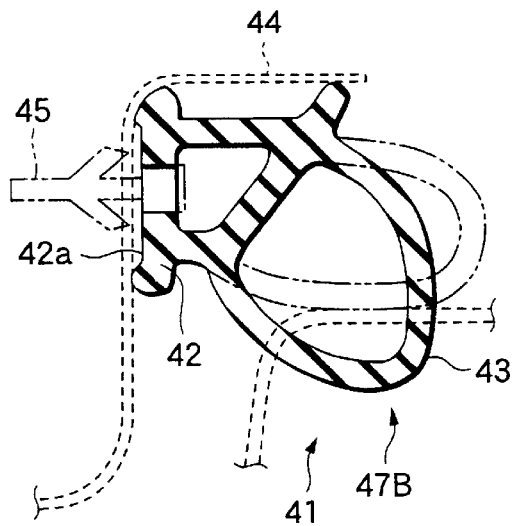
FIG. 7B shows an enlarged cross-sectional view taken on line 7b—7b in FIGS. 6A and 6B.
Figure 7C:
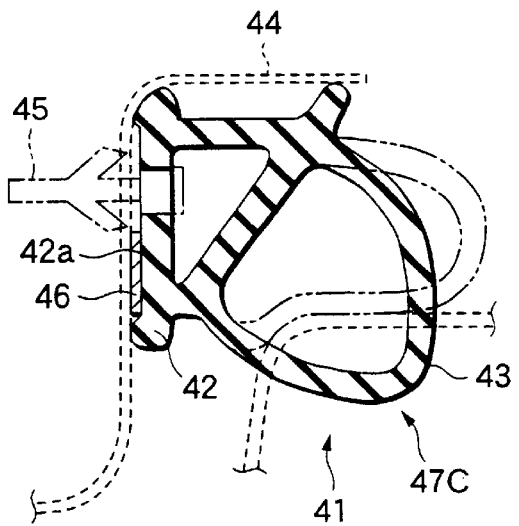
FIG. 7C shows an enlarged cross-sectional view taken on line 7c—7c in FIG. 6B.

On the other hand, as shown in FIGS. 3 to 5, in the front side door 23 to which the door weather strip 11 is attached, there is provided a flat outer peripheral surface 26 which is formed along a door opening 25 of an automobile body 24. In the peripheral edge of the door 23 except for the front side edge on the hinge side, there is provided an extending surface 27 which extends in a direction substantially perpendicular to the outer peripheral surface 26. At a position of the door 23 corresponding to the twisted face 22 of the door weather strip 11, there is provided a curved surface 31 which corresponds to the twisted face 22. The outer peripheral surface 26 and the extending surface 27 continue to each other by this curved surface 31.

The door weather strip 11 is mounted on the door 23 as follows. At the front side edge of the door 23, the first mounting face 20 of the door weather strip 11 is fixed onto the outer peripheral surface 26 of the door 23 by the conventional clips. At the upper side edge of the door 23, the first mounting face 20 is attached onto the outer peripheral surface 26 of the door 23 by the clips and the double-sided adhesive tape. At the rear side edge of the door 23, the second mounting face 21 of the door weather strip 11 is attached onto the extending surface 27 and the first mounting face 20 of the door weather strip 11 is fixed to the peripheral surface 26 by clips 29. In this case, as shown in FIG. 5, attaching is conducted while the attaching position of the double-sided adhesive tape 28 of the twisted face 22 on the rear mold molding section 15 is being successively changed from the outer peripheral surface 26 to the extending surface 27 through the curved surface 31 of the door 23.

When the door weather strip 11 is mounted on the door 23, the double-sided adhesive tape 28, which is one piece of adhesive tape, is made to adhere onto the second mounting face 21 from the first mounting face 20 via the twisted face 22 so that the adhesive tape can be extended from the front mold molding section 14 to a rear upper section of the lower extrusion molding section 13 via the upper extrusion molding section 12 and the rear mold molding section 15. In this case, the double-sided adhesive tape 28 is located at a substantially upper half peripheral section of the door weather strip 11 to the belt line L of the door 23 and made to adhere onto the mounting faces 20, 21 which cross the opening and closing direction of the door 23.

Further, a plurality of clips 29 are arranged at predetermined intervals on the first mounting face 20 of the door weather strip 11. When these clips 29 are inserted into the engaging holes 30 formed on the outer peripheral surface 26 of the door 23, the first mounting face 20 of the door weather strip 11 is fixed to the outer peripheral surface 26 of the door 23 at predetermined intervals with respect to the entire periphery. At the same time, in the substantially upper half peripheral section of the door weather strip 11 to the belt line L of the door 23, an attaching face which continues from the first mounting face 20 to the second mounting face 21 via the twisted face 22 is continuously attached by the double-sided adhesive tape 28 onto a surface which continues from the outer peripheral surface 26 of the door 23 to the extending surface 27 via the curved surface 31.

In the structure for mounting the above door weather strip 11, it is possible to make one piece of double-sided adhesive tape 28 adhere continuously from the first mounting face 20 on the front mold molding section 14 and the upper extrusion molding section 12 to the second mounting face 21 close to the rear upper portion of the lower extrusion molding section 13 via the twisted face 22 on the rear molding section 15. Accordingly, the double-sided adhesive tape 28 can be simply made to adhere. Especially, a portion of the door weather strip 11 higher than the belt line L of the door 23 can be positively made to adhere to the periphery of the door 23 while a sufficiently high sealing property is ensured. Accordingly, there is no possibility that rain water flowing to the rear portion along the upper side edge of the door weather strip 11 turns round the rear mold molding section 15 at the rear upper portion and gets into the automobile cabin.

When the door 23 is closed with respect to the door opening 25 of the automobile body 24 under the condition that the door weather strip 11 is mounted on the door 23 as described above, direction P of closing the door 23 is set at a direction which crosses the first mounting face 20 to which the adhesive tape 28 adheres, the twisting face 22 and the second mounting face 21 as shown in FIGS. 3, 4 and 5. Therefore, when the door 23 is closed, the hollow seal section 17 of the door weather strip 11 is deformed as shown by chain lines in FIGS. 3, 4 and 5. Accordingly, even if the door weather strip 11 is given a load, the direction of which is the same as the closing direction P, the load acts as a compressive force with respect to the adhesion face of the adhesive tape 28. Consequently, when the door 23 is closed, there is no possibility that the adhesion face of the adhesive tape 28 is peeled off from the end portion. Therefore, there is no possibility that the life of adhesion of the adhesive tape 28 is shortened.

Effects expected to the above embodiment will be described as follows.

(a) In the mounting structure of this door weather strip, two mounting faces 20, 21, which make a right angle with each other and extend in the longitudinal direction, are formed in the mounting base section 16 of the door weather strip 11, and the twisted face 22 which continues from the first mounting face 20 to the second mounting face 21, is formed between these mounting faces 20, 21. One piece of double-sided adhesive tape 28 is continuously provided from the first mounting face 20 to the second mounting face 21 via the twisted face 22, and the mounting faces 20, 21 and the twisted face 22 are made to adhere to the door 23 by the double-sided adhesive tape 28.

Therefore, when only one piece of adhesive tape 28 is used for adhesion, the door weather strip 11 can be easily attached to the door 23, and the manufacturing cost can be reduced. Since the adhesive tape 28 is continuously made to adhere onto the two mounting faces 20, 21, no break of the sealing line is caused in the middle of the mounting face of the door weather strip 11, that is, the door weather strip can be tightly bonded to the door 23 with continuous sealing. Therefore, it is possible to prevent water from leaking into the automobile cabin in the middle portion of the door weather strip 11.

(b) In the mounting structure of this door weather strip, the twisted face 22 is provided in the rear upper mold molding section 15 of the door weather strip 11.

Therefore, the rear upper mold molding section 15 of the door weather strip 11 can be more positively sealed, so that rain water flowing along the upper edge of the door weather strip 11 can be prevented from getting into the automobile cabin from the rear upper mold molding section 15.

(c) In the mounting structure of this door weather strip, the door weather strip 11 is composed of the upper extrusion molding section 12 and the lower extrusion molding section 13 which are connected with each other by mold molding sections 14, 15. The adhesive tape 28 extends at least from the upper extrusion molding section 12 to the rear upper portion of the lower extrusion molding section 13 via the mold molding section 15 of the corner section.

The door weather strip 11 can be composed of two extrusion molding sections 12, 13 and two mold molding sections 14, 15, and the number of parts can be decreased so as to reduce the manufacturing cost. Further, the adhesive tape 28 seals a portion adjacent to the upper portion at the rear of the lower extrusion molding section 13 via the mold molding section 15 of the corner section. Therefore, rain water flowing to the rear portion along the upper side edge of the door weather strip 11 can be positively prevented from turning round the rear mold molding section 15 and getting into the automobile cabin.

(d) In the mounting structure of this door weather strip, the adhesive tape 28 is provided in a substantially upper half peripheral section of the door weather strip 11 to a portion close to the belt line L of the door.

Accordingly, a portion of the door weather strip 11 which is higher than the belt line L of the door can be sufficiently sealed. Therefore, water can be positively prevented from getting into the automobile cabin. Concerning the portion of the door weather strip 11 which is lower than the belt line L of the door, there is no possibility that water gets into the automobile cabin even if the portion is not sufficiently sealed. Therefore, the door weather strip 11 can be easily attached to the door by the conventional clips. Accordingly, the manufacturing cost can be reduced.

(e) In the mounting structure of this door weather strip, the adhesive tape 28 is provided on mounting faces 20, 21 on the side crossing the opening and closing direction of the door 23.

Therefore, a load given to the door weather strip 11 in the case of closing the door can be acted in a direction which crosses the adhesion face of the adhesive tape 28. Therefore, the life of adhesion of the door weather strip 11 can be extended. Accordingly, the sealing property of the door weather strip 11 can be kept at a predetermined level over a long period of time.

Variation

In this connection, it is possible to vary this embodiment as follows.

In the above embodiment, a portion of the door weather strip higher than the belt line L of the door is fixed to the periphery of the door 23 when the double-sided adhesive tape 28 and the clips 29 are cooperated with each other. However, this portion may be fixed to the peripheral surface of the door 23 only by the double-sided adhesive tape 28.

The above variation may be adopted to obtain the substantially same effect as that of the aforementioned embodiment.

In the above embodiment, the structure for mounting the door weather strip 11 on the front door 23 is realized. However, it is possible to realize the structure for mounting the door weather strip on the rear door.

The above variation may be adopted to obtain the substantially same effect as that of the aforementioned embodiment.

Further, according to the present invention, a door weather strip is provided, which comprises an extrusion molding section comprising a mounting base section mountable on a periphery of a door and a hollow seal section formed on the mounting base section, a mold molding section comprising a mounting base section and a hollow seal section being continuously formed from the extrusion molding, and a double-sided adhesive tape. The extrusion molding section further comprises a first mounting face and a second mounting face each being formed on the mounting base section, wherein the first and second mounting faces are disposed to substantially make a right angle with each other. The mold molding section further comprises the first and second mounting faces being continuously formed from the extrusion molding, and a twisted face continuously formed on the mounting base section and between the first mounting face and the second mounting face. The double-sided adhesive tape is continuously provided from the first mounting face to the second mounting face via the twisted face.

It is preferable that the mold molding section is formed in a substantially L-shape so as to correspond to a corner of the door and be connected to a horizontal part and a vertical part of the extrusion molding section, and the double-sided adhesive tape is continuously provided from the first mounting face of the horizontal part of the extrusion molding section to the second mounting face of the vertical part of the extrusion molding section via the twisted face of the mold molding section.

Since the present invention is composed as described above, the following effects can be provided.

According to the present invention, the adhesive tape can be easily attached to the door weather strip, and the door weather strip can be easily attached to the door. Therefore, the manufacturing cost can be reduced. It is possible to tightly fix the door weather strip to the door without causing an uncontinuous region of the sealing in the middle on the mounting face of the door weather strip.

According to the present invention, rain water flowing to the rear portion along the upper side edge of the door weather strip can be prevented from getting into an automobile cabin from the corner section.

According to the present invention, the number of parts of the door weather strip is decreased, so that the manufacturing cost can be reduced. A portion close to the rear upper portion of the lower extrusion molding section can be sealed by the adhesive tape via the mold molding section of the corner section. Therefore, rain water can be positively prevented from getting into the automobile cabin.

According to the present invention, a portion of the weather strip higher than the belt line of the door can be tightly sealed. A portion of the weather strip lower than the belt line of the door, the requested sealing property of which is not so high, can be easily fixed to the door by the conventional clips. Therefore, the manufacturing cost can be reduced.

According to the present invention, the sealing property of the door weather strip can be kept at a predetermined level over a long period of time.

Although the invention has been described in its preferred form with a certain degree of particularity, it is understood that the present disclosure of the preferred form can be arrangement of parts without departing from the spirit and the scope of the invention as hereinafter claimed.

What is claimed is:

1. A door weather strip for mounting on a periphery of a door of an automobile, said weather strip having a mounting base section mountable on the periphery of the door and a hollow seal section formed on said mounting base section, said mounting base section comprising:

a first mounting face and a second mounting face, said first and second mounting faces being disposed to substantially make a right angle with respect to each other and extending in a longitudinal direction of said door weather strip;

a twisted face continuously formed on said mounting base section and between said first mounting face and said second mounting face; and a double-sided adhesive tape being continuously provided from said first mounting face to said second mounting face via said twisted face so that said first and second mounting faces and said twisted face are able to be tightly bonded to the door via said double-sided adhesive tape with continuous sealing.

2. A door weather strip according to claim 1, wherein said twisted face is provided in a rear upper corner section of said door weather strip.

3. A door weather strip according to claim 1, wherein said door weather strip comprises a horizontal extrusion molding section and a vertical extrusion molding section which are connected with each other by a mold molding section, said horizontal and vertical extrusion molding sections comprising the mounting base section, said mold molding section comprising the twisted face, and said double-sided adhesive tape extends at least from said horizontal extrusion molding section to said vertical extrusion molding section via said mold molding section.

4. A door weather strip according to claim 1, wherein said double-sided adhesive tape is provided along a substantial portion of an upper half of said door weather strip to a portion close to a belt line of the door.

5. A door weather strip according to claim 1, wherein an opening and closing direction of the door crosses one of said first and second mounting faces.

6. A door weather strip comprising:

an extrusion molding section comprising a mounting base section mountable on a periphery of a door and a hollow seal section formed on said mounting base section, wherein said extrusion molding section further comprises a first mounting face and a second mounting face each being formed on said mounting base section, said first and second mounting faces being disposed to substantially make a right angle with respect to each other;

a mold molding section comprising a mounting base section and a hollow seal section being continuously formed from said extrusion molding section, wherein said mold molding section further comprises:

a twisted face continuously formed on said mounting base section of said mold molding section and between said first mounting face and said second mounting face; and a double-sided adhesive tape being continuously provided from said first mounting face to said second mounting face via said twisted face.

7. A weather strip according to claim 6, wherein said mold molding section is substantially L-shaped so as to correspond to a corner of the door and be connected to a horizontal part and a vertical part of said extrusion molding section, and said double-sided adhesive tape is continuously provided from said first mounting face of the horizontal part of said extrusion molding section to said second mounting face of the vertical part of said extrusion molding section via said twisted face of said mold molding section.

* * * * *